US008867886B2

(12) United States Patent
Feinson (10) Patent No.: US 8,867,886 B2
(45) Date of Patent: *Oct. 21, 2014

(54) SURROUND VIDEO PLAYBACK (75) Inventor: Roy Feinson, Washington, DC (US)

(73) Assignee: Roy Feinson, Washington, DC (US)

( * ) Notice: Subject to any disclaimer, the term of this patent is extended or adjusted under 35 U.S.C. 154(b) by 65 days.

This patent is subject to a terminal disclaimer.

(21) Appl. No.: 13/205,518

(22) Filed: Aug. 8, 2011

(65) Prior Publication Data

US 2013/0039632 A1    Feb. 14, 2013

(51) Int. Cl.
*H04N 5/77* (2006.01)
*H04N 5/765* (2006.01)
*H04N 5/775* (2006.01)
*H04N 9/80* (2006.01)
*H04N 5/932* (2006.01)
*H04N 5/935* (2006.01)

(52) U.S. Cl.
CPC ........................................ *H04N 5/77* (2013.01)
USPC ........... 386/223; 386/201; 386/210; 386/334; 386/230; 386/242

(58) Field of Classification Search
USPC ......... 386/201, 210, 223, 224, 230, 242, 239, 386/248, 252, 255
See application file for complete search history.

(56) References Cited

U.S. PATENT DOCUMENTS

| 7,672,569 | B2* | 3/2010 | Horiuchi et al. | |
|---|---|---|---|---|
| 7,876,353 | B2* | 1/2011 | Piccionelli et al. | |
| 8,279,279 | B2* | 10/2012 | Hattori et al. | |
| 2001/0033332 | A1* | 10/2001 | Kato et al. | 348/211 |
| 2003/0189589 | A1* | 10/2003 | LeBlanc et al. | 345/723 |
| 2004/0085451 | A1* | 5/2004 | Chang | |
| 2005/0213666 | A1* | 9/2005 | Kaneko et al. | 375/240.26 |
| 2007/0070210 | A1* | 3/2007 | Piccionelli et al. | 348/211.11 |
| 2011/0001791 | A1* | 1/2011 | Kirshenboim et al. | 348/43 |

OTHER PUBLICATIONS http://multianglevideo.com/online-player/, Aug. 8, 2011.

* cited by examiner

*Primary Examiner* — Daquan Zhao (57) ABSTRACT

Methods and systems are disclosed including a computing device configured to allow a user to view a multi-stream video from a selected angle/direction with respect to the contents of the multi-stream video, under the user's control. The multi-stream video is generated using multiple Image Acquisition Devices (IAD), such as cameras, simultaneously, consecutively, or independently filming a scene, each IAD having a different position with respect to each of the other IADs. Each image data stream obtained from each IAD may be uniquely identified to allow selective real-time playback of image data streams under user control. Each image data stream represents a corresponding viewing angle to the user. The user may dynamically change the selection of an image stream, and thus the viewing angle, while viewing a recorded scene. Multiple image streams of the same scene may be selected and viewed simultaneously to provide 3D or other visual effects.

16 Claims, 6 Drawing Sheets

SURROUND VIDEO PLAYBACK

CROSS REFERENCE TO RELATED APPLICATIONS

The present application is related to an application entitled "SURROUND VIDEO RECORDING," application Ser. No. 13/151,150, filed on 1 Jun. 2011, the specification of which is hereby incorporated by reference in its entirety.

TECHNICAL FIELD

This application relates generally to video recording. More specifically, this application relates to surround video recording and playback using multiple cameras as separately playable data streams.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references video cameras, it will be appreciated that the disclosure may be used with other types of image acquisition, such as films, ultrasound, Magnetic Resonance Imaging (MRI), and the like.

Briefly described, a device and a method are disclosed, including a computing device configured to allow a user to view a multi-stream video from a selected angle with respect to the contents of the multi-stream video under the user's control. In various embodiments, the multi-stream video is generated using multiple Image Acquisition Devices (IAD), such as cameras, simultaneously, consecutively, or independently filming a scene, each IAD having a known position with respect to each of the other IADs. Each image data stream obtained from each IAD may be uniquely identified, by the position of the IAD or by a unique identifier, to allow selective real-time display and/or playback (for pre-recorded image streams) of each individual image data stream under the control of the user. Depending on the position of an IAD, the image data stream collected by the IAD represents a corresponding viewing angle, with respect to the contents of the multi-stream video, to the user. Thus, the user may select a different viewing angle for the same scene by selecting a corresponding image stream during real-time viewing and/or playback. In various embodiments, the user may change the selection of an image stream dynamically while viewing a recorded scene. In some embodiments the user may program the viewing device to show the scenes from different available angles based on predetermined criteria, such as change of the scene angle every few minutes, based on scene content, or based on a timeline of the video. In various embodiments, multiple image streams of the same scene may be selected and viewed simultaneously to provide a 3-Dimensional (3D) effect or other visual effects. In some embodiments not all angles are available for all the scenes and in other embodiments the arrangements of the IADs may be different from scene to scene.

Over the years, various image playback technologies and techniques have been developed ranging from black and white silent film to digital discs, such as DVD, with high resolution images, 3-D playback capabilities, and surround sound. 3-D playback techniques have been enabled by stereo recording, which entails using two synchronized cameras to film a scene simultaneously to be later viewed by a user as a 3D image.

In a few viewing arrangements users may have the ability to interact with the film content being played. Generally, user interactions have been very limited including picture adjustment, color adjustment, moving forward and backward (for example, when using DVD players) in the film stream, and the like. With commonly available technologies, the user is generally not able to change the user's viewing angle of the same scene while watching a film, in effect, interacting with the visual content of the film.

Illustrative Operating Environment

Figure 1:
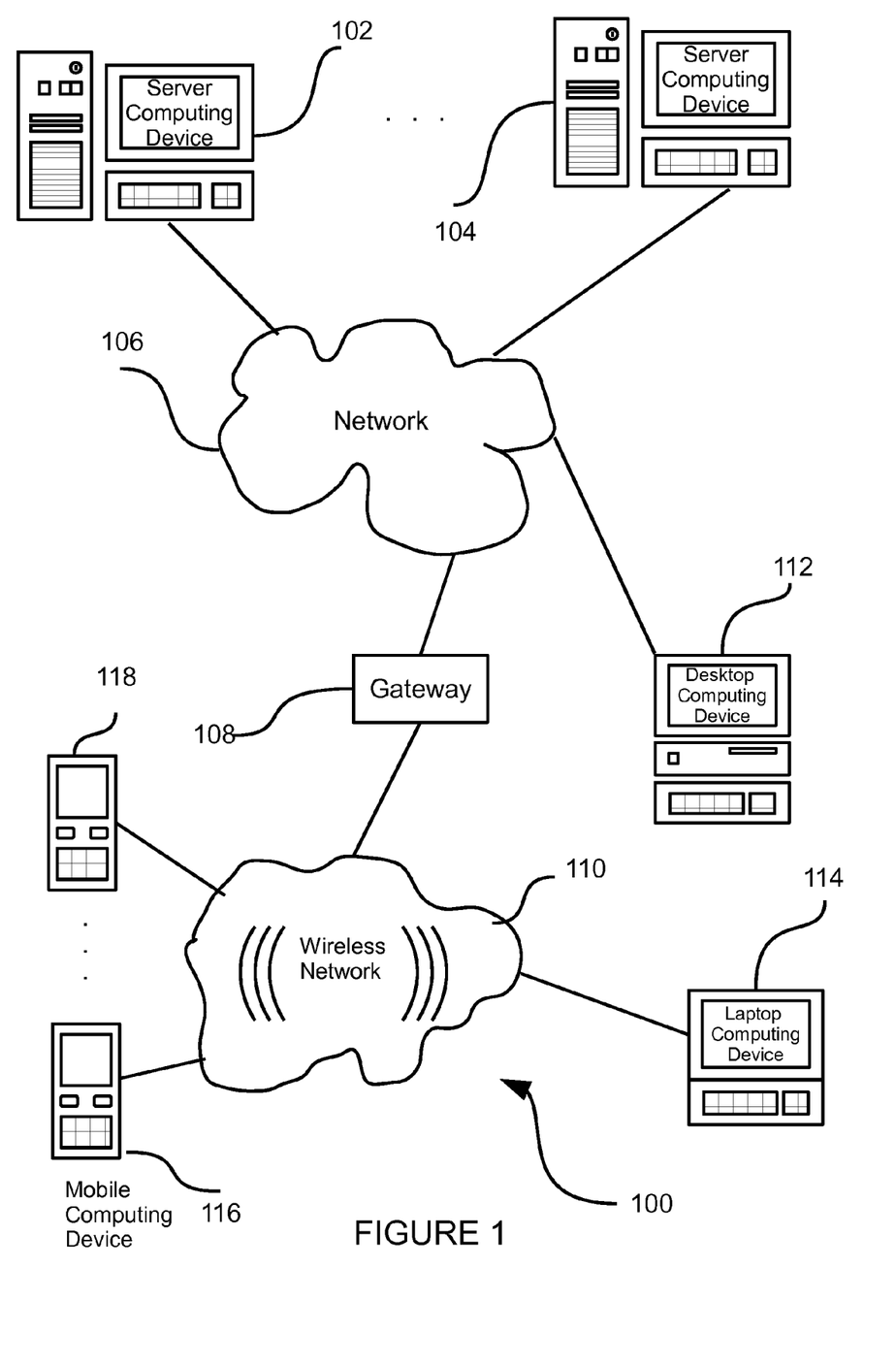
FIG. 1 shows an embodiment of a network computing environment wherein the disclosure may be practiced.

FIG. 1 shows components of an illustrative environment in which the disclosure may be practiced. Not all the shown components may be required to practice the disclosure, and variations in the arrangement and type of the components may be made without departing from the spirit or scope of the disclosure. System 100 may include Local Area Networks (LAN) and Wide Area Networks (WAN) shown collectively as Network 106, wireless network 110, gateway 108 configured to connect remote and/or different types of networks together, client computing devices 112-118, and server computing devices 102-104.

One embodiment of a computing device usable as one of client computing devices 112-118 is described in more detail below with respect to FIG. 2. Briefly, however, client computing devices 112-118 may include virtually any device capable of receiving and sending a message over a network, such as wireless network 110, or the like. Such devices include portable devices such as, cellular telephones, smart phones, display pagers, radio frequency (RF) devices, music players, digital cameras, infrared (IR) devices, Personal Digital Assistants (PDAs), handheld computers, laptop computers, wearable computers, tablet computers, integrated devices combining one or more of the preceding devices, or the like. Client device 112 may include virtually any computing device that typically connects using a wired communications medium such as personal computers, multiprocessor systems, microprocessor-based or programmable consumer electronics, network PCs, or the like. In one embodiment, one or more of client devices 112-118 may also be configured to operate over a wired and/or a wireless network.

Client devices 112-118 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphic, text, multimedia, or the like, employing virtually any web based language, including a wireless application protocol messages (WAP), or the like. In one embodiment, the browser application may be enabled to employ one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client computing devices 112-118 also may include at least one other client application that is configured to receive content from another computing device, including, without limit, server computing devices 102-104. The client application may include a capability to provide and receive textual content, multimedia information, or the like. The client application may further provide information that identifies itself, including a type, capability, name, or the like. In one embodiment, client devices 112-118 may uniquely identify themselves through any of a variety of mechanisms, including a phone number, Mobile Identification Number (MIN), an electronic serial number (ESN), mobile device identifier, network address, such as IP (Internet Protocol) address, Media Access Control (MAC) layer identifier, or other identifier. The identifier may be provided in a message, or the like, sent to another computing device.

Client computing devices 112-118 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, to another computing device. However, the present disclosure is not limited to these message protocols, and virtually any other message protocol may be employed.

Client devices 112-118 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 112-118 may employ any of a variety of client applications to access content, read web pages, receive/send messages, or the like. In one embodiment, for example, the user may employ a browser or other client application to access a web page hosted by a Web server implemented as server computing device 102. In one embodiment, messages received by client computing devices 112-118 may be saved in non-volatile memory, such as flash and/or PCM, across communication sessions and/or between power cycles of client computing devices 112-118.

Wireless network 110 may be configured to couple client devices 114-118 to network 106. Wireless network 110 may include any of a variety of wireless sub-networks that may further overlay stand-alone ad-hoc networks, and the like, to provide an infrastructure-oriented connection for client devices 114-118. Such sub-networks may include mesh networks, Wireless LAN (WLAN) networks, cellular networks, and the like. Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2 G), 3rd (3 G), $4^{th}$ (4 G), generation and any future generation technologies for radio access for cellular systems, WLAN, Wireless Router (WR) mesh, and the like. Access technologies such as 3 G, 4 G, and future access networks may enable wide area coverage for mobile devices, such as client devices 114-118 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 106 is configured to couple one or more servers depicted in FIG. 1 as server computing devices 102-104 and their respective components with other computing devices, such as client device 112, and through wireless network 110 to client devices 114-118. Network 106 is enabled to employ any form of computer readable media for communicating information from one electronic device to another. Also, network 106 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 106 may include any communication method by which information may travel between computing devices. Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

Illustrative Computing Device Configuration

Figure 2:
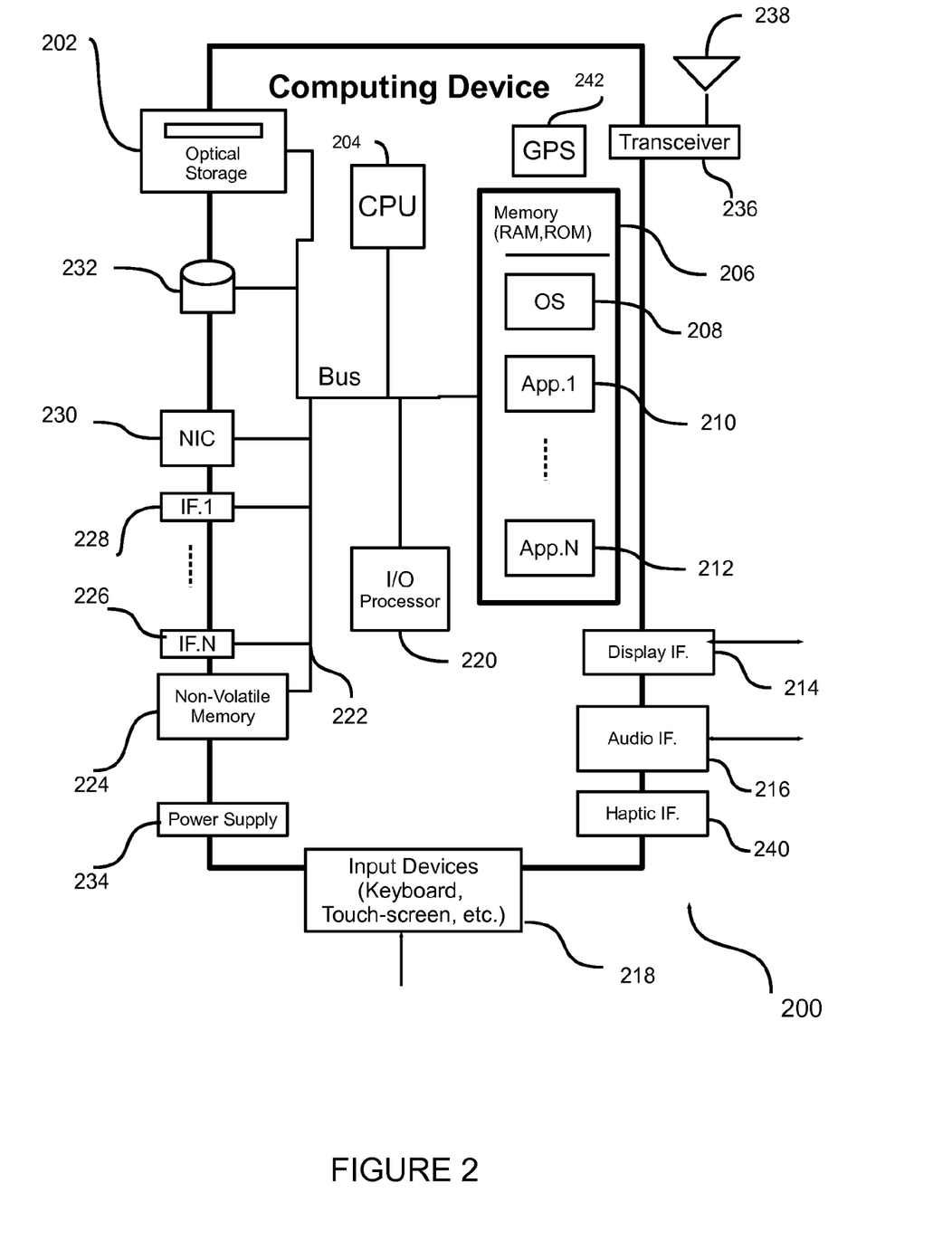
FIG. 2 shows an embodiment of a computing device that may be used in the network computing environment of FIG. 1.

FIG. 2 shows an illustrative computing device 200 that may represent any one of the server and/or client computing devices shown in FIG. 1. A computing device represented by computing device 200 may include less or more than all the components shown in FIG. 2 depending on the functionality needed. For example, a mobile computing device may include the transceiver 236 and antenna 238, while a server computing device 102 of FIG. 1 may not include these components. Those skilled in the art will appreciate that the scope of integration of components of computing device 200 may be different from what is shown. As such, some of the components of computing device 200 shown in FIG. 2 may be integrated together as one unit. For example, NIC 230 and transceiver 236 may be implemented as an integrated unit. Additionally, different functions of a single component may be separated and implemented across several components instead. For example, different functions of I/O processor 220 may be separated into two or more processing units.

With continued reference to FIG. 2, computing device 200 includes optical storage 202, Central Processing Unit (CPU) 204, memory module 206, display interface 214, audio interface 216, input devices 218, Input/Output (I/O) processor 220, bus 222, non-volatile memory 224, various other interfaces 226-228, Network Interface Card (NIC) 320, hard disk 232, power supply 234, transceiver 236, antenna 238, haptic interface 240, and Global Positioning System (GPS) unit 242. Memory module 206 may include software such as Operating System (OS) 208, and a variety of software application programs 210-212. Computing device 200 may also include other components not shown in FIG. 2. For example, computing device 200 may further include an illuminator (for example, a light), graphic interface, and portable storage media such as USB drives. Computing device 200 may also include other processing units, such as a math co-processor, graphics processor/accelerator, and a Digital Signal Processor (DSP).

Optical storage device 202 may include optical drives for using optical media, such as CD (Compact Disc), DVD (Digital Video Disc), and the like. Optical storage devices 202 may provide inexpensive ways for storing information for archival and/or distribution purposes.

Central Processing Unit (CPU) 204 may be the main processor for software program execution in computing device 200. CPU 204 may represent one or more processing units that obtain software instructions from memory module 206 and execute such instructions to carry out computations and/or transfer data between various sources and destinations of data, such as hard disk 232, I/O processor 220, display interface 214, input devices 218, non-volatile memory 224, and the like.

Memory module 206 may include RAM (Random Access Memory), ROM (Read Only Memory), and other storage means, mapped to one addressable memory space. Memory module 206 illustrates one of many types of computer storage media for storage of information such as computer readable instructions, data structures, program modules or other data. Memory module 206 may store a basic input/output system (BIOS) for controlling low-level operation of computing device 200. Memory module 206 may also store OS 208 for controlling the general operation of computing device 200. It will be appreciated that OS 208 may include a general-purpose operating system such as a version of UNIX, or LINUX™, or a specialized client communication operating system such as Windows Mobile™, or the Symbian® operating system. OS 208 may, in turn, include or interface with a Java virtual machine (JVM) module that enables control of hardware components and/or operating system operations via Java application programs.

Memory module 206 may further include one or more distinct areas (by address space and/or other means), which can be utilized by computing device 200 to store, among other things, applications and/or other data. For example, one area of memory module 206 may be set aside and employed to store information that describes various capabilities of computing device 200, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. In one embodiment, using the browser application, a user may view an article or other content on a web page with one or more highlighted portions as target objects.

Display interface 214 may be coupled with a display unit (not shown), such as liquid crystal display (LCD), gas plasma, light emitting diode (LED), or any other type of display unit that may be used with computing device 200. Display units coupled with display interface 214 may also include a touch sensitive screen arranged to receive input from an object such as a stylus or a digit from a human hand. Display interface 214 may further include interface for other visual status indicators, such Light Emitting Diodes (LED), light arrays, and the like. Display interface 214 may include both hardware and software components. For example, display interface 214 may include a graphic accelerator for rendering graphic-intensive outputs on the display unit. In one embodiment, display interface 214 may include software and/or firmware components that work in conjunction with CPU 204 to render graphic output on the display unit.

Audio interface 216 is arranged to produce and receive audio signals such as the sound of a human voice. For example, audio interface 216 may be coupled to a speaker and microphone (not shown) to enable communication with a human operator, such as spoken commands, and/or generate an audio acknowledgement for some action.

Input devices 218 may include a variety of device types arranged to receive input from a user, such as a keyboard, a keypad, a mouse, a touchpad, a touch-screen (described with respect to display interface 214), a multi-touch screen, a microphone for spoken command input (describe with respect to audio interface 216), and the like.

I/O processor 220 is generally employed to handle transactions and communications with peripheral devices such as mass storage, network, input devices, display, and the like, which couple computing device 200 with the external world. In small, low power computing devices, such as some mobile devices, functions of the I/O processor 220 may be integrated with CPU 204 to reduce hardware cost and complexity. In one embodiment, I/O processor 220 may the primary software interface with all other device and/or hardware interfaces, such as optical storage 202, hard disk 232, interfaces 226-228, display interface 214, audio interface 216, and input devices 218.

An electrical bus 222 internal to computing device 200 may be used to couple various other hardware components, such as CPU 204, memory module 206, I/O processor 220, and the like, to each other for transferring data, instructions, status, and other similar information.

Non-volatile memory 224 may include memory built into computing device 200, or portable storage medium, such as USB drives that may include PCM arrays, flash memory including NOR and NAND flash, pluggable hard drive, and the like. In one embodiment, portable storage medium may behave similarly to a disk drive. In another embodiment, portable storage medium may present an interface different than a disk drive, for example, a read-only interface used for loading/supplying data and/or software.

Various other interfaces 226-228 may include other electrical and/or optical interfaces for connecting to various hardware peripheral devices and networks, such as IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), HDMI (High Definition Multimedia Interface), and the like.

Network Interface Card (NIC) 230 may include circuitry for coupling computing device 200 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Hard disk 232 is generally used as a mass storage device for computing device 200. In one embodiment, hard disk 232 may be a Ferro-magnetic stack of one or more disks forming a disk drive embedded in or coupled to computing device 200. In another embodiment, hard drive 232 may be implemented as a solid-state device configured to behave as a disk drive, such as a flash-based hard drive. In yet another embodiment, hard drive 232 may be a remote storage accessible over network interface 230 or another interface 226, but acting as a local hard drive. Those skilled in the art will appreciate that other technologies and configurations may be used to present a hard drive interface and functionality to computing device 200 without departing from the spirit of the present disclosure.

Power supply 234 provides power to computing device 200. A rechargeable or non-rechargeable battery may be used to provide power. The power may also be provided by an external power source, such as an AC adapter or a powered docking cradle that supplements and/or recharges a battery.

Transceiver 236 generally represents transmitter/receiver circuits for wired and/or wireless transmission and receipt of electronic data. Transceiver 236 may be a stand-alone module or be integrated with other modules, such as NIC 230. Transceiver 236 may be coupled with one or more antennas for wireless transmission of information.

Antenna 238 is generally used for wireless transmission of information, for example, in conjunction with transceiver 236, NIC 230, and/or GPS 242. Antenna 238 may represent one or more different antennas that may be coupled with different devices and tuned to different carrier frequencies configured to communicate using corresponding protocols and/or networks. Antenna 238 may be of various types, such as omni-directional, dipole, slot, helical, and the like.

Haptic interface 240 is configured to provide tactile feedback to a user of computing device 200. For example, the haptic interface may be employed to vibrate computing device 200, or an input device coupled to computing device 200, such as a game controller, in a particular way when an event occurs, such as hitting an object with a car in a video game.

Global Positioning System (GPS) unit 242 can determine the physical coordinates of computing device 200 on the surface of the Earth, which typically outputs a location as latitude and longitude values. GPS unit 242 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS unit 242 can determine a physical location within millimeters for computing device 200. In other cases, the determined physical location may be less precise, such as within a meter or significantly greater distances. In one embodiment, however, a mobile device represented by computing device 200 may, through other components, provide other information that may be employed to determine a physical location of the device, including for example, a MAC address.

Figure 3:
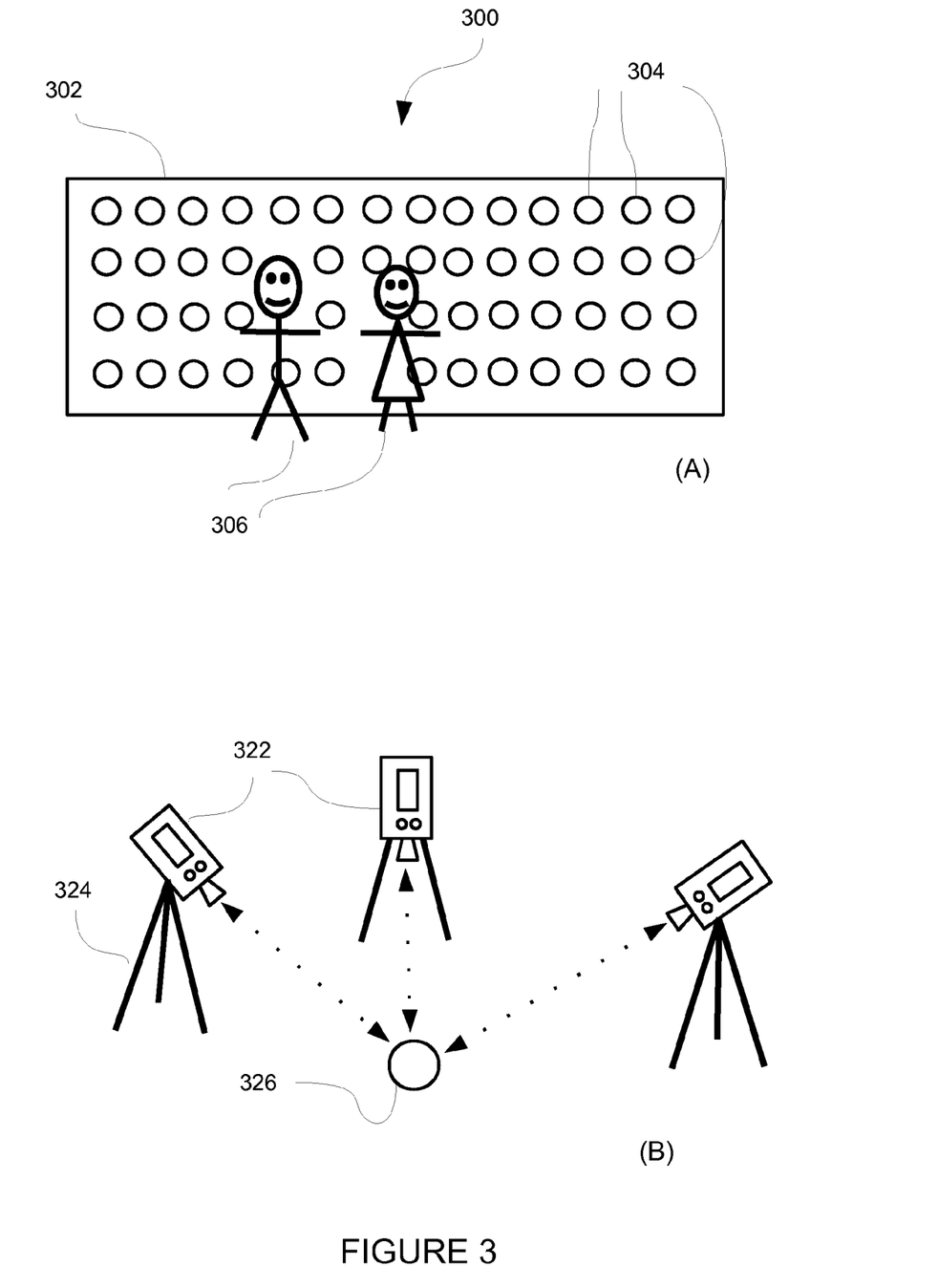
FIG. 3A shows an example surround filming mounting matrix configured to film a scene.
FIG. 3B shows an example surround filming apparatus with independently positioned cameras configured to film a scene.

FIG. 3A shows an example surround filming mounting matrix configured to film a scene. In various embodiments, a surround video recording arrangement 300 includes IAD (Image Acquisition Device) mounting matrix 302 is used to support and position many IADs 304, on the order of 10's, 100's, or more IADs to record a scene 306. In another embodiment the many IADs 304 are stand-alone IADs and are not mounted on a mounting matrix.

In various embodiments, user-controlled playback of a multi-stream video is enabled by recording arrangement 300, where scene 306 is recorded simultaneously using multiple IADs to generate a multi-stream video, each IAD recording the same scene from a different direction. In some embodiments, the IADs may be synchronized to start recording the scene at the same time, while in other embodiments, the recorded scene may be post synchronized on a frame number and/or time basis. In yet another embodiment at least two of the IADs may record the scenes consecutively. Each IAD generates an independent image stream of the same scene, but from a different direction compared with other IADs, depending on the IAD's position in mounting matrix 302 or, in general, with respect to other IADs. The image streams obtained independently may be tagged for identification and integrated into one multi-stream video allowing dynamic user selection of each of the image streams during playback for viewing.

In some recording embodiments, multiple IADs are positioned sufficiently close to each other to allow substantially visually smooth transition between IAD image streams at viewing time, real-time or prerecorded, when the viewer/user selects a different viewing angle. For example, during playback, when a user moves a viewing angle of a scene using a control device, such as a joystick, from left to right of the scene, the image stream smoothly changes, showing the scene from the appropriate angle, as if the user himself is walking around the scene and looking at the scene from different angles. In other recording embodiments, the IADs may not be close to each other and the viewer/user can drastically change its viewing direction. In yet other embodiments the same scene may be recorded more than one time, from different coordinates and/or and angles, in front of the same IAD to appear as if more than one IAD had captured the original scene from different directions. In such arrangement, to enhance the impact of that particular scene on the user, each act may be somewhat different from the similar acts performed at other angles. Such recordings may be later synchronized and presented to the viewer/user to create the illusion of watching the same scene from multiple angles/directions.

During user-controlled playback, each independent image stream may be viewed separately in real-time or be recorded for later viewing based on a user's selection of the independent image stream. In general, during playback, the user will not be aware of the fact that the independent image streams may not have been recorded simultaneously. In various embodiments, the independent image streams may be electronically mixed together to form a single composite signal for transmission and/or storage, from which a user-selected image stream may be separated by electronic techniques, such as frequency filtering and other similar signal processing methods. Such signal processing techniques include both digital and analog techniques depending on the type of signal.

In various embodiments, multiple image streams may be combined into a multi-stream video, each stream of which is selectable and separable from the multi-stream video at playback time. The multi-stream video may be packaged as a single video file or as multiple files usable together as one subject video. An end user may purchase a DVD including the multi-stream video for viewing with variable angles under the user's control. Alternatively, the user may download, stream, or otherwise obtain and view the multi-stream video with different viewing angles and directions under his control. The user may be able to download or stream only the direction-/angle-recordings he/she wants to view later on.

In various embodiments, after filming is complete, the videos from each camera or IAD may be transferred to a computer hard drive or other similar storage device. In some embodiments, IADs acquire an analog image stream, while in other embodiments, IADs acquire a digital image stream. Analog image streams may be digitized prior to storage on digital storage devices, such as computer hard disks. In some embodiments, each image stream or video may be labeled or tagged with a number or similar identifier corresponding to the IAD from which the image stream was obtained in the mounting matrix. Such identifier may generally be mapped to a viewing angle/direction usable by a user during viewing.

In various embodiments, the image stream identifier is assigned by the IAD itself. In other embodiments, the identifier is assigned by a central controller of multiple IADs. In still other embodiments, the image streams may be independently recorded by each IAD, such as a complete video camera, on a separate medium, such as a tape, and be tagged later manually or automatically during integration of all image streams into a single multi-stream video.

In various embodiments, mounting matrix 302 may be one, two, or three dimensional such as a curved, spherical, or flat mounting system providing a framework for housing a matrix of IADs mounted to the outside (scene facing side) of the mounting matrix with lenses pointing inward to a center of the curved matrix. A coverage of 360° around a scene may be provided by encasing the scene in a spherical mounting matrix completely covered with cameras. For large scenes, some or all IADs may be individually placed at desired locations around the scenes, as further described below. In some embodiments, the mounting matrix are some of the individual IADs are dynamically movable, for example, by being assembled on a wheeled platform, to follow a scene during active filming.

Similarly to camera lenses discussed above, in the case of a spherical, or near spherical mounting matrix used to encase the subject scene during filming, lighting may be supplied through a series of small holes in the mounting matrix. Because of their regularity of placement, shape and luminosity, these lights may also be easily automatically recognized and removed in post production.

In other various embodiments, mounting matrix 302 is not used. These embodiments are further described below with respect to FIG. 3B.

In some embodiments, at least one or all IADs are standalone independent cameras, while in other embodiments, each IAD is an image sensor in a network arrangement coupled to a central recording facility. In still other embodiments, an IAD is a lens for collecting light and transmitting to one or more image sensors via an optical network, such as a fiber optic network. In still other embodiments, IADs may be a combination of one or more of the above.

In various embodiments, the image streams generated by the IADs are pre-synchronized prior to the commencement of recording a scene. Such pre-synchronization may be performed by starting the recording by all the IADs simultaneously, for example, by a single remote control device sending a broadcast signal to all IADs. In other embodiments, the IADs may be coupled to each other to continuously synchronize the start of recording and their respective frame rates while operating. Such continuous synchronization between IADs may be performed by using various techniques, such as using a broadcast running clock signal, using a digital message passing bus, and the like, depending on the complexity and functionality of the IADs.

In other embodiments, at least some of the image streams generated by the IADs are post-synchronized, after the recording of the scene. The object of synchronization is to match up the corresponding frames in multiple image streams, which are recorded from the same scene, from different angles, but at substantially the same time. Post synchronization may be done using various techniques, such as time-based techniques, frame-based techniques, content matching, and the like.

In various embodiments, in time-based techniques, a global timestamp is used on each image stream and the corresponding image frames are matched together based on their respective timestamps. In frame-based techniques, a frame count from a starting common frame position on all image streams is used to match up subsequent image frames in the image stream. For example, the starting common frame may include an initial one or few frames of a special scene recorded for this purpose, such as a striped pattern. In content-matching techniques, elements of image frame contents may be used to match up corresponding frames. Those skilled in the art will appreciate that other methods for post-synchronization may be used without departing from the spirit of the present disclosures.

In various embodiments, the surround video recording arrangement may be completely integrated with current 3D recording and/or viewing technology by employing an offset between IADs recording the same scene, which are positioned a predetermined distance apart from each other. Because image streams from different IADs are user selectable during viewing, an enhanced or exaggerated 3D effect may be effected by selecting image streams from IADs, which were farther away from each other during recording than cameras used in a normal 3D stereo recording set slightly apart, usually about the distance between human eyes. This dynamic selectability of image streams provides a variable 3D feature while viewing a scene. Recently, 3D video and movies have been rapidly becoming ubiquitous and a "4-D" surround video, where a 3D image may also be viewed from different angles dynamically, further enhances this trend.

While generally it may not be necessary to employ multiple sound tracks in a surround video recording system, and a single master sound track may generally suffice, if each IAD or camera on the mounting matrix included an attached or built-in microphone, and the soundtracks for each image stream were switched with the corresponding image stream, a surround-sound effect, which in effect moves the sound along with the camera view, may be achieved through a single playback speaker, in contrast to traditional surround sound systems, which need multiple speakers. For example, in a conversation scene, as image streams are selected from corresponding camera positions, which were closer to a particular actor during filming, the actor's voice would be heard louder than an image stream corresponding to a camera farther away from the actor.

Those skilled in the art will appreciate that the surround video system may be applied to still images instead of full motion videos. Using still cameras in the mounting matrix, a user may "move around" objects photographed by the system by changing the photographed viewing angle.

In various embodiments, the surround video system may be used to address video pirating problems. A problem confronted by media producers is that content may be very easily recorded by a viewer/user and disseminated across the Internet. Multiple image streams provided by the surround video system may be extremely difficult to pirate and still provide the entire interactive viewing experience. While it would be possible for a pirate to record and disseminate a single viewing stream, there is no simple way to access the entire set of camera angles that make up the surround video experience.

FIG. 3B shows an example surround filming apparatus with independently positioned cameras configured to film a scene. In some embodiments, instead of using one integrated mounting matrix, independently positioned IADs 322, such as video cameras, are deployed on independent supports 324, such as tripods, to record a scene 326. In such embodiments, which may be employed in filming large areas, such as outdoor scenes, IADs may be positioned at arbitrary points around the subject scene for recording a film substantially simultaneously or consecutively. Synchronization may be performed post image acquisition on different image streams so obtained. Simultaneous synchronization by wired or wireless methods is also possible in case of separately located IADs. The various IAD positions may be specified with respect to each other, using various techniques, such as using GPS, 3D grid-based specification, metes and bounds, and the like. Generally, knowing the physical location and the direction of the line of sight of an IAD, allows the determination of the angle or direction of viewing of the subject scene.

Figure 4:
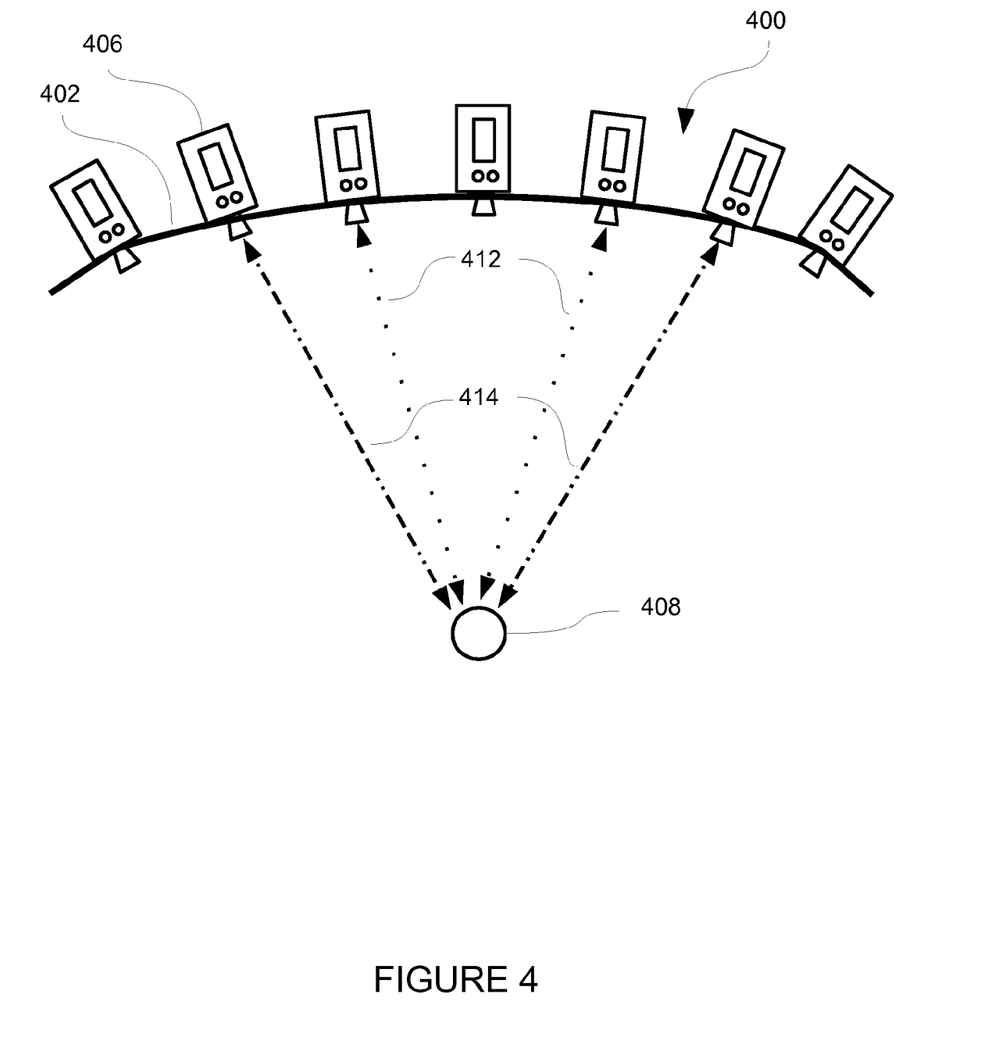
FIG. 4 shows an example camera mounting matrix configured to provide various degrees of 3-D stereoscopic effect on playback.

FIG. 4 shows an example camera mounting matrix configured to provide various degrees of 3-D stereoscopic effect on playback. In various embodiments, recording arrangement 400 includes mounting matrix 402 is used to position and hold multiple recording devices 406 substantially focused on scene area 408. Light beams 412 and 414 correspond to different camera pairs configured to provide 3-D and more intense or enhanced 3-D effects, respectively.

One function of mounting matrix 402 is to provide a housing structure for the cameras or other recording devices, which are mounted in a predetermined or regular pattern, close enough together to facilitate smooth transitioning between image streams during playback. The shape of the mounting matrix modifies the user experience during playback. The ability to transform the shape of the mounting matrix based on the scene to be filmed, allows different recording angles/directions and thus, different playback experiences.

In various embodiments, mounting matrix 402 is structurally rigid enough to reliably and stably support multiple recording devices 406, yet flexible enough to curve around the subject scene to provide a surround effect with different viewing angles of the same subject scene. In various embodiments, mounting matrix 402 may be a substantially rectangular plain, which may flex in two different dimensions of its plane, for example, horizontally and vertically, to surround the subject scene from side to side (horizontal) or from top to bottom (vertical). In other various embodiments, mounting matrix 402 may be a plane configurable to take various planar shapes, such as spherical, semi-spherical, or other 3D planar shapes. The different shapes of the mounting matrix enable different recording angles and thus different playback perspectives and angles.

In various embodiments, selected pairs of cameras 406 and the corresponding image data streams may provide various degrees of 3D visual effects. For example, a first camera pair corresponding with light beams 412 provide image data streams, which when viewed simultaneously during playback create a 3D visual effect with a corresponding perspective depth. A second camera pair corresponding with light beams 414 provide image data streams, which when viewed simultaneously during playback create a different 3D visual effect with a different and/or deeper corresponding perspective depth, compared to the first camera pair, thus, enhancing and heightening the stereoscopic effect of the camera pair. Other visual effects may be created using selected camera pairs, which are not on the same horizontal plane but separated along a path in 2D or 3D space on the mounting matrix.

Figure 5:
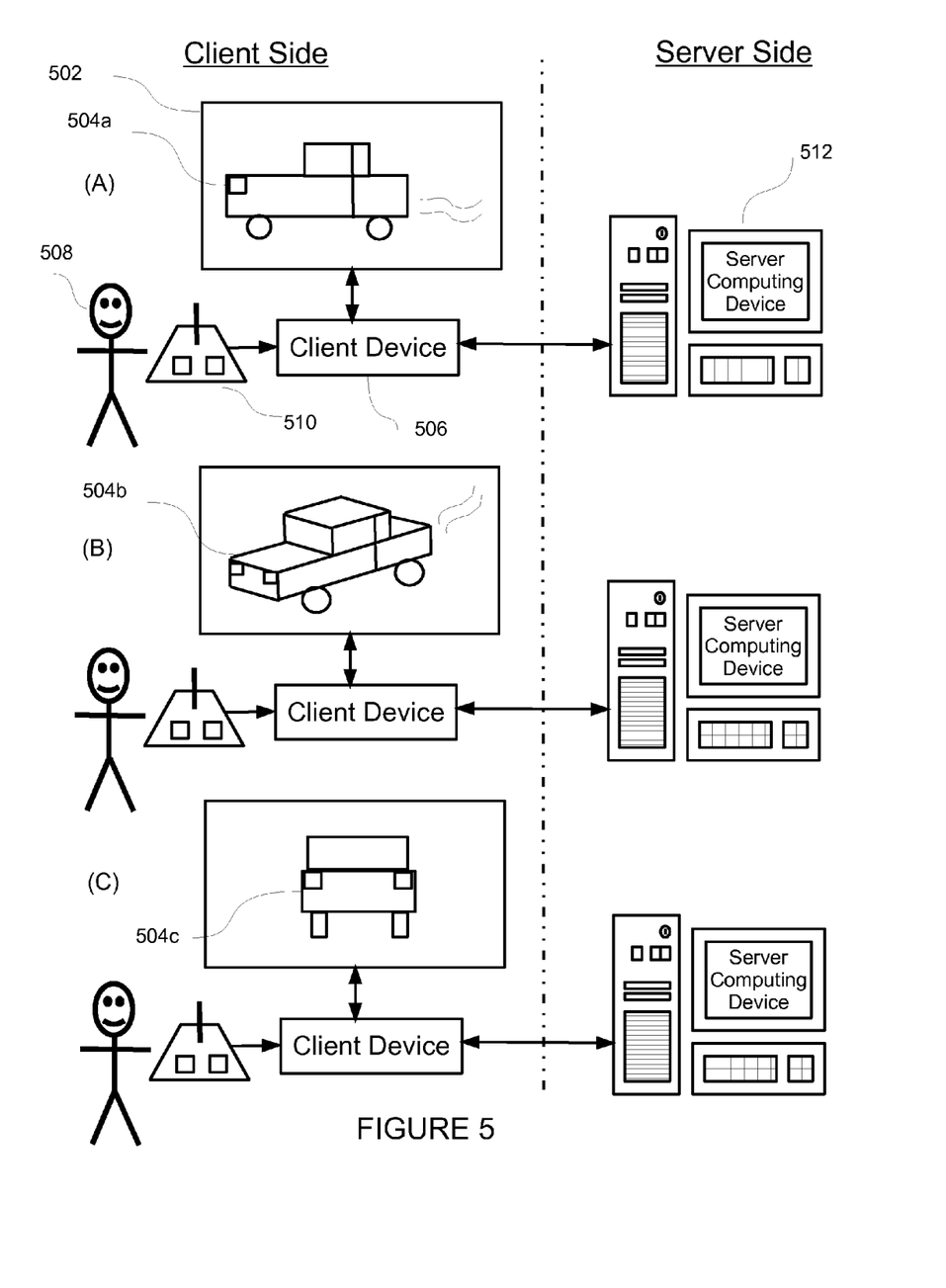
FIG. 5A shows an example client-server environment configured to playback a multi-stream video shown from a first viewing angle under user control.
FIG. 5B shows the example client-server environment of FIG. 5A configured to playback the multi-stream video shown from a second viewing angle under user control.
FIG. 5C shows the example client-server environment of FIG. 5A configured to playback the multi-stream video shown from a third viewing angle under user control.

FIGS. 5A-C depict an example environment showing user controlled viewing of a multi-stream video from different angles. FIG. 5A shows an example client-server environment configured to playback a multi-stream video shown from a first viewing angle under user control. In various embodiments, display screen 502 is coupled with client device 506, similar to the client computing devices discussed with respect to FIGS. 1 and 2 above, and further coupled with a user control device 510, such as a joystick. User 508 may view multi stream video content 504a on screen 502. Client device 506 may be coupled with server 512 where the multi stream video is partially or wholly stored. Each and every connection between modules depicted in FIGS. 5A through 5C may be a wired or wireless connection or a combination thereof.

In various embodiments, client device 506 is used to store part or all of multi stream video content 504a. For example, the video may be stored on a hard disk, an optical medium such as a DVD, and the like, on the client device. Alternatively, part or all of the multi stream video may be downloaded from a computer network. The multi stream video may also be downloaded from a server via a network in a client-server arrangement. Once part or all of the multi stream video is stored on the client device, a multi stream media player may be used to play the video. Those skilled in the art will appreciate that the multi stream media player is generally implemented as an application software program configured to play multimedia files, such as sound and video files. In various embodiments, the multi stream media player may be implemented as a browser plug-in component or a standalone software program. In other embodiments, the multi stream media player may be built into the client device, while in other embodiments, the multi stream media player may be downloaded from a server via a network. The server from which the surround media player is downloaded may or may not be the same server used to store the multi stream video.

Those skilled in the art will appreciate that the multi stream video may be generated in real time by the IADs and transmitted for display live on the client device with or without storage of the video. Those skilled in the art will also appreciate that the data streams of a multi stream video, associated with separate IDAs, may be transmitted from any source point to any destination point, as mixed or separately transmitted signals.

In various embodiments, a software multi stream controller module may run on the server and configured to communicate with and receive user inputs via the network from the multi stream media player running on the client device. This arrangement provides more anti piracy security and control at the server over the playback of the multi stream video. In operation, as user inputs are received by the multi stream controller running on the server, one or a few of the appropriate image data streams are selected and transmitted across the network at a time for playback on the multi stream media player on the client device. This technique substantially prevents pirating, or makes pirating much more difficult, for example, by copying, all image data streams and corresponding synchronization information constituting the multi stream video.

In some embodiments the number of angles/directions a user can view the scenes of a movie may be restricted according to the user's membership level or the user's contractual agreement with the provider. For example a user who pays the provider $10 per month for his viewing privileges may be restricted to the data collected by a single or two IDAs but a user whose monthly payment is $50 can receive data collected by eight or 10 IDAs.

In various embodiments, control device 510 is coupled to the client device 506 via a wired or wireless hardware connection and a software interface, such as a device driver software module. Those skilled in the art will appreciate that a device driver may be implemented in different ways depending on the computing platform architecture. In various embodiments, the device driver may only obtain raw data or signals from the control device and send the data to other software modules for processing, while in other embodiments, the device driver may obtain and process the data itself. In still other embodiments, the device driver obtains the data and partially processes the data before sending it to other software modules for further processing. In other various embodiments, user input may be obtained via other input methods or devices, such as keyboard, touchpad, mouse, and the like, described above with respect to FIG. 2.

In various embodiments, overall system performance or throughput may be enhanced using buffering on the client device. Some or all of the image data streams constituting the multi stream video may be pre-fetched, cached or pre-buffered from the server to allow ready access to different image data streams based on user command without noticeable lag. Those skilled in the art will appreciate that many techniques may be used for accessing and loading different image data streams to minimize lag in response to user input. For example, multiple simultaneous channels may be used to download different image data streams from remote servers. Additionally, different buffering techniques and algorithms may be used to cache data for fast access before use. Such techniques include variations of lazy algorithms, greedy algorithms, least recently used (LRU) algorithms, and the like.

In various embodiments, the multi stream video may serve as an anti-piracy or security feature. For example, in a web streaming arrangement where image data streams are downloaded via the web and played in a browser, each image data stream may be downloaded only at the time it will be viewed. A major problem confronted by media producers is that content can be easily recorded by a viewer and disseminated across the internet. It would be extremely difficult to pirate the entire interactive viewing experience enabled by multi stream video, which includes multiple image data streams, mapping of image data streams to various viewing angles, and synchronization information that coordinates the timing and/or corresponding playback positions of the multiple image data streams. While it may be possible for a pirate to record and disseminate a single viewing stream, there may be no simple way to access the entire set of camera angles that make up the multi stream video experience.

In operation, in various embodiments, user 508 selects a multi stream video to be played on the multi stream media player. The multi stream media player loads the selected video from any source or storage available, as discussed above, or previously configured and set up as default source for accessing selected videos. For example, the selected video may be downloaded from server 512. The multi stream media player starts displaying the selected video on screen 502. User 508 may change the viewing angle displayed on screen 502 using control device 510. In various embodiments, the user may move the joystick in a particular direction causing the viewing angle/direction of the video content to be changed in a corresponding direction as if the user is moving around and viewing a physical object from a different angles. For example, user 508 may move the joystick handle to the left and view a car on screen 502 rotated counterclockwise with respect to the screen. Those skilled in the art will appreciate that the motion of the joystick may be mapped in different ways to the resulting change in motion on the screen. For example, a leftward movement of the joystick handle may cause a clockwise rotation of the image, or rotation about other axis of rotation with respect to the screen. In various embodiments, such mapping of the control device movements to the resulting rotation of the image on the screen may be configurable by the user. User 508 may be able to jump from one direction of viewing to the other by pressing a single button or multiple buttons, each of which is associated with a predetermined angle of viewing, etc.

The virtual rotation of or movement towards or away from the image contained in the multi stream video is implemented by selecting a different image data stream of the multi stream video in response to a user input into the control device. For example, a first image data stream of the multi stream video may show a car moving parallel to the plane of the screen from right to left, and a second image data stream of the multi stream video may show the same car moving at a particular (non-zero) angle relative to the plane of the display screen. If the user viewing the first image data stream moves the joystick handle to a different position, then a device driver for the control device obtains the resulting signal from the control device and the device driver, or another software module within the client device, processes the signal and loads and displays the second image data stream. The second image data stream is selected based on a predetermined mapping between the control device signals (resulting from the user inputs to the control device, such as moving a joystick handle) and the multiple image data streams contained in the multi stream video. For example, a left movement of the joystick handle may generate a particular signal, which is already pre-mapped to the second image data stream, for example, using a mapping table in the client device's memory.

Similarly to the virtual rotation of video content described above, a user input via the control device, may cause a zoomed-in (or closer) or a zoomed-out (or farther) view of the same scene or video content in an active image data stream. Additionally, the user may control virtual panning of the same scene by selecting, via input to the control device, a series of image data stream, each of which show a slightly different and contiguous section of the same scene, providing the illusion of panning across the scene as it is being played. In some embodiments, when a user zooms in or out with respect to a currently playing scene, the selected zoom factor is preserved or locked when the user changes the viewing angle by loading a different image data stream.

In some embodiments the user may program the viewing device to show the scenes from different available angles based on predetermined criteria, such as periodic change of the scene viewing angle such as every few minutes, based on scene content, based on embedded tags in the image data streams, or based on a timeline of the video. In various embodiments, the multi stream media player may provide a user interface to allow the user to configure automatic viewing angle and/or zoom factor change based on the aforementioned or other criteria. In other embodiments, the user may store such scene alteration commands (viewing angle change and zoom factor change) in a user command file to be automatically applied to the multi stream video while playing on the multi stream media player without user intervention.

In some embodiments, the user may be allowed to record and integrate the user commands with the multi stream video for future viewing. In these embodiments, the user may view the multi stream video while also recording the sequence and timing, with respect to the timeline of the video, of the user commands to change viewing angles and/or zooming in and out. For example, the user may be viewing a car chase scene while zooming in and out and also changing his angles of viewing the scene. Simultaneously, the multi stream media player may record the sequence and time of the user's commands and store such information in the user command file. Subsequently, the user command file may be used as input while playing the same multi stream video. In effect, applying the user command file to the multi stream video is as if the user is controlling the playback using the control device. This arrangement is useful in capturing a particular user's visual talents in viewing a scene from particular angles and with particular zoom factors, like a movie director. The effect of the particular user's efforts may then be enjoyed by other users using the user command file. Various cinematic competitions may be held based on this arrangement also, for example, on social networking websites.

In various embodiments, the transition between a first and second image data stream under user control is automatically made smooth by the client device and/or a software module, such as the multi stream media player, by loading intermediate image data streams before loading the second image data stream. If the second image data stream is too different, as measured by some measure of distance such as viewing angle or panning distance, then intermediate image data streams may be momentarily loaded and played to provide the illusion of a smooth transition between the first and the second image data streams. For example, if the first image data stream shows the scene at a particular angle, and the second image data stream shows the same scene at an angle which is 90 degrees offset compared with the particular angle, then other image data streams showing the same scene at increments of 5 degrees may be loaded and shown successively before loading and displaying the second image data stream.

Similarly to the virtual rotation operation, in virtual panning operations, intermediate image data streams may be used to smooth these operations. In other embodiments, the second image data streams is loaded and displayed on user command without showing intermediate image data streams. In various embodiment, a mode of operation with respect to type of transition, such as smooth or abrupt, may be configured by the user. In various embodiments, the degree of smoothness may also be configurable. The degree of smoothness indicates how gradually the transition from one angle to another takes place.

In various embodiments, when a different image data stream is selected and displayed in response to user input (via the control device), a different corresponding sound track of the multi stream video may also be loaded and played. For example, if a user moves the joystick handle to rotate or move towards a different actor in a scene, then the voice of the closer actor is played louder compared to the voice of other actors in the same scene.

Those skilled in the art will appreciate that the techniques described above with respect to the multi stream video are substantially applicable to still images as well. A multi view image or picture may include multiple images of the same scene or object selectable by user input. For example, a multi view picture of a car may include side views, top view, front view, rear view, and other views from angles between the aforementioned views. The user may then be able to virtually move around or zoom in and out relative to the car to enable 360 degree viewing of the picture.

FIG. 5B shows the example client-server environment of FIG. 5A configured to playback the multi-stream video shown from a second viewing angle under user control. As described above with respect to FIG. 5A, a movement of the joystick handle by the user selects a different image data stream of the multi stream video, thus, resulting in a different perspective or viewing angle of the same video content 504*b* being displayed on the screen. For example, by moving the joystick handle, the user has caused content 504*b* to be displayed instead of content 504*a*, both of the same scene within the video but each one from a different angle.

FIG. 5C shows the example client-server environment of FIG. 5A configured to playback the multi-stream video shown from a third viewing angle under user control. Similarly to FIG. 5B, a third viewing angle is depicted in this figure corresponding to the selection and display of content 504*c* included in a third image data stream of the multi stream video based on user input.

Figure 6:
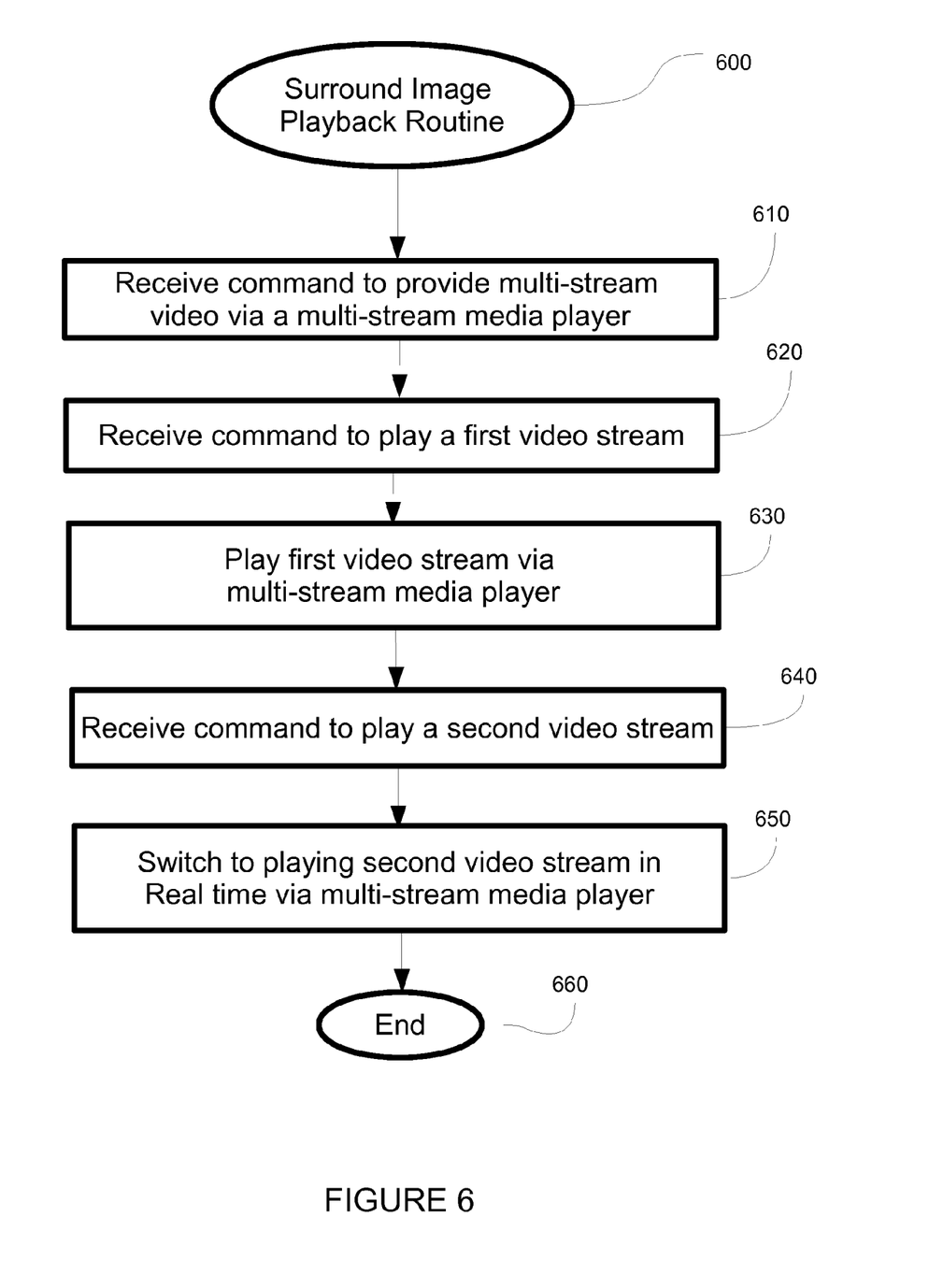
FIG. 6 shows an example flow diagram for a surround image playback routine.

FIG. 6 shows an example flow diagram for a surround image playback routine. In various embodiments, and with reference to FIG. 5A, routine 600 proceeds to block 610 where a user command is received by the client device to play a selected multi stream video using a multi stream media player. The user command may be in the form of a series of interactions, via a GUI, with the client device to launch the multi stream media player and load the selected multi stream video. The routine proceeds to block 620.

At block 620, a user command is received to indicate which of several image data streams to initially play. In various embodiments, an interface may be presented to the user to select an initial image data stream. In other embodiments, a default initial or primary image data stream may be defined or designated by the user or the producer of the multi stream video, which is played initially when the multi stream video is loaded. Other image data streams are then loaded based on subsequent user inputs. The routine proceeds to block 630.

At block 630, the initial image data stream of the multi stream video, selected as described above, is loaded and played. At this point, the multi stream media player may be able to receive further user commands to display other angles of the same scene dynamically. The routine proceeds to block 640.

At block 640, the user may input a new command, via the control device, to change the viewing angle. A new viewing angle corresponds to a second image data stream, which is loaded for playing. The routine proceeds to block 650.

At block 650, the second image data stream is played. In various embodiments, before playing the second image data stream, intermediate data streams are loaded and played to smooth the transition from the first to the second image data stream. The routine proceeds to block 660.

At block 660, the routine terminates. As discussed above, between blocks 640 and 650, the routine may automatically and momentarily display scenes from other data streams which smooth and/or enhance the transition between the first video stream and the second video stream.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the disclosure.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems which perform the specified actions or steps, or combinations of special purpose hardware and computer instructions.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A surround video system comprising:
    a client device configured to receive, simultaneously or consecutively, live or prerecorded, image data streams collected by at least one Image Acquisition Device (IAD), from a plurality of viewing angles of a scene or retakes of a scene; and
    a user control device coupled with the client device and configured to generate a signal usable to change the user's viewing angle of the scene from a current viewing angle to a selected one of the plurality of viewing angles, each of the plurality of viewing angles corresponding to one of the image data streams obtained from a different IAD, wherein the change of the user's viewing angle comprises a visually smooth transition by automatically transitioning from the current viewing angle to at least one intermediate viewing angle, obtained from an IAD, between the current and the selected one of the plurality of viewing angles, and then transitioning to the selected one of the plurality of viewing angles.

2. The surround video system of claim 1, further comprising a server device.

3. The surround video system of claim 1, further comprising a multi stream media player, wherein the multi stream media player is a web-based application configured to run on a web browser.

4. The surround video system of claim 1, wherein the image data from each IAD includes sound data recorded by a recording device associated with each IAD.

5. The surround video system of claim 4, wherein each of the plurality of the image data streams is generated using a separate IAD configured to record the scene and/or retake of the scene as other IADs or at least one IAD generates more than one image data stream by recording multiple takes of the scene from more than one angle, or a combination thereof.

6. The surround video system of claim 4, wherein the plurality of image data streams are synchronized.

7. The surround video system of claim 4, wherein the plurality of image data streams is uniquely identified.

8. The surround video system of claim 4, wherein each of the plurality of image data streams is user selectable during a playback of the multi stream video.

9. The surround video system of claim 1, wherein the control device is a joystick.

10. The surround video system of claim 1, wherein the control device is one of a keyboard, a touchpad, and a mouse.

11. The surround video system of claim 1, wherein the multi stream video is downloaded from a server device and buffered on the client device.

12. A server device comprising:

a multi stream controller module configured to run on the server device and configured to communicate with a client device;

wherein the multi stream controller module is further configured to use data received from the client device to select one of a plurality of simultaneous or consecutive image data streams of a multi stream video;

wherein the data received from the client device is configured to cause a visually smooth transition from a current viewing angle by automatically transitioning from the current viewing angle to at least one intermediate viewing angle between the current and a selected one of a plurality of viewing angles, each of the plurality of viewing angles corresponding to one of the image data streams obtained from a different Image Acquisition Device (IAD), and then transitioning to the selected one of the plurality of viewing angles of a user of the client device; and wherein each viewing angle is associated with one of the plurality of the simultaneous or consecutive image data streams of the multi stream video.

13. The server device of claim 12, further comprising a storage device configured to store the multi stream video.

14. The server device of claim 12, wherein the multi stream video comprises at least one sound track.

15. The server device of claim 12, wherein the data received from the client device comprises user commands to change a viewing angle of a content of the multi stream video.

16. The server device of claim 12, wherein the server transmits only one selected image data stream to the client device to prevent pirating of the multi stream video.

\* \* \* \* \*